United States Patent
Erimli et al.

(10) Patent No.: US 6,480,500 B1
(45) Date of Patent: Nov. 12, 2002

(54) ARRANGEMENT FOR CREATING MULTIPLE VIRTUAL QUEUE PAIRS FROM A COMPRESSED QUEUE PAIR BASED ON SHARED ATTRIBUTES

(75) Inventors: Bahadir Erimli, Campbell, CA (US); Yatin R. Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 166 days.

(21) Appl. No.: 09/881,848

(22) Filed: Jun. 18, 2001

(51) Int. Cl.[7] ............................ H04L 12/54; G06F 3/00
(52) U.S. Cl. .................. 370/412; 370/429; 370/521; 710/39; 710/54; 710/129
(58) Field of Search ........................ 370/412, 429, 370/389, 395.2, 395.1, 413, 415, 416, 417, 418, 912; 709/231, 247; 710/1, 39, 54, 129.68, 56, 100, 112, 263, 52, 53; 711/4, 5, 6, 129, 213

(56) References Cited

U.S. PATENT DOCUMENTS

| | | | |
|---|---|---|---|
| 5,442,752 A | * | 8/1995 | Styczinski |
| 6,081,848 A | * | 6/2000 | Grun et al. |
| 6,094,435 A | * | 7/2000 | Hoffman et al. |
| 6,170,030 B1 | * | 1/2001 | Bell |
| 6,243,787 B1 | * | 6/2001 | Kagan et al. |

OTHER PUBLICATIONS

Daniel Cassiday, InfiniBand™ Architecture Tutorial, Hot Chips, Aug. 2000, Sun Microsystems, 79 pages.

* cited by examiner

*Primary Examiner*—William Luther
(74) *Attorney, Agent, or Firm*—Manelli Denison & Selter PLLC

(57) ABSTRACT

A host channel adapter is configured for efficiently managing multiple queue pairs by compressing queue pairs having similar properties into queue pair tables configured for storing compressed queue pair entries having shared attributes. Hence, multiple virtual queue pairs can be created out of fewer physical queue pairs stored within a queue pair attribute database.

10 Claims, 3 Drawing Sheets

ARRANGEMENT FOR CREATING MULTIPLE VIRTUAL QUEUE PAIRS FROM A COMPRESSED QUEUE PAIR BASED ON SHARED ATTRIBUTES

BACKGROUND OF THE INVENTION

1. Field of the Invention

The present invention relates to a host channel adapter configured for communication with target channel adapters, and managing queue pairs used in the transmission of data packets in an InfiniBand™ server system.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, accessibility, and serviceability.

In addition, processors used in servers have encountered substantial improvements, where the microprocessor speed and bandwidth have exceeded the capacity of the connected input/out (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between central processing units, peripherals, and switches inside a server system. Hence, the term "InfiniBand™ network" refers to a network within a server system. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading"), hence offloading the operating system of the server system.

However, arbitrary hardware implementations may result in substantially costly hardware designs. A host channel adapter (HCA) manages multiple queue pairs (QPs), which are used by consumer applications at InfiniBand™ network nodes for communication of data. Unfortunately, a substantially large number of queue pairs can be generated, which may require the HCA to expand a substantially large amount of resources to manage the large number of queue pairs.

SUMMARY OF THE INVENTION

There is a need for an arrangement that enables a host channel adapter to be implemented in an efficient and economical manner.

There also is a need for an arrangement that enables a host channel adapter to manage multiple queue pairs without a substantial expenditure of resources.

These and other needs are attained by the present invention, where a host channel adapter is configured for efficiently managing multiple queue pairs by compressing queue pairs having similar properties into queue pair tables configured for storing compressed queue pair entries having shared attributes.

One aspect of the present invention provides a method in a host channel adapter. The method includes receiving a request for creation of a new queue pair. The method also includes identifying one of a plurality of queue pair tables by determining a match between at least one selected attribute for the new queue pair with respective shared attributes of the queue pair tables, each queue pair table having compressed queue pair entries representing queue pairs having the corresponding shared attribute. The method also includes storing a new compressed queue pair entry having prescribed attributes of the new queue pair, distinct from the corresponding shared attribute, in the one shared queue pair table having the corresponding shared attribute matching the at least one selected attribute.

Another aspect of the present invention provides a host channel adapter. The host channel adapter includes a queue pair attributes database and a queue pair attributes management module. The queue pair attributes database is configured for storing prescribed attributes of queue pairs, the queue pair attributes database including a plurality of queue pair tables having respective shared attributes, each queue pair table configured for storing compressed queue pair entries representing queue pairs having the corresponding shared attribute. The queue pair attributes management module is configured for storing a new queue pair, as a new compressed queue pair entry, in an identified one of the queue pair tables having the corresponding shared attribute matching at least one selected attribute of the new queue pair, the new compressed queue pair entry having prescribed attributes of the new queue pair, distinct from the corresponding shared attribute.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
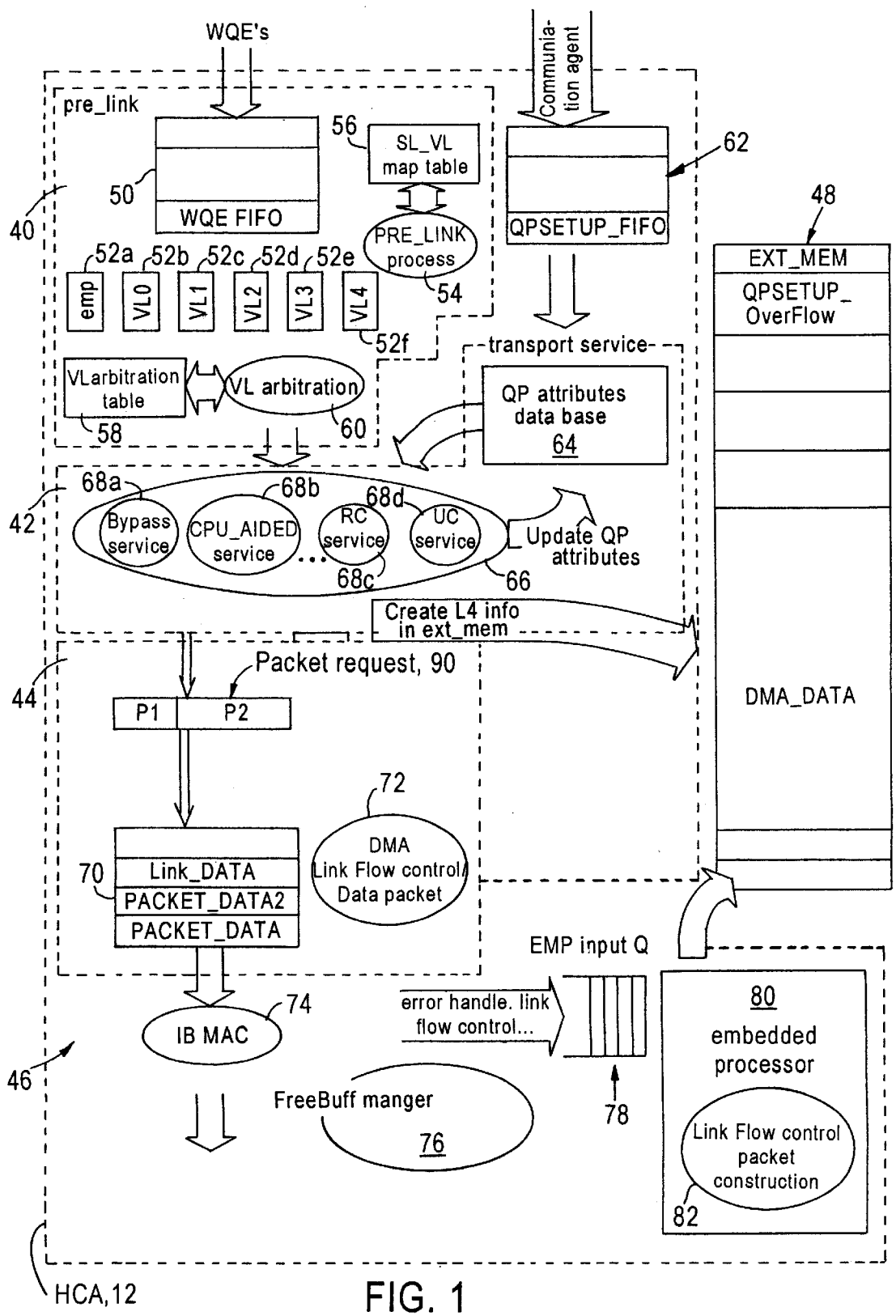
FIG. 1 is a diagram illustrating a host channel adapter configured for generating transmit packets according to an embodiment of the present invention.

FIG. 1 is a block diagram illustrating a host channel adapter (HCA) 12 configured for generating and transmitting packets according to an embodiment of the present invention. The HCA 12, compliant with the InfiniBand™ Architecture Specification, is implemented in a manner that ensures that hardware resources are efficiently utilized by generating transmit packets according to a priority-based ordering. In addition, the disclosed HCA 12 provides flexibility by enabling embedded processes to be added without disruption of traffic flow. Hence, the HCA 12 can be implemented in an economical manner with minimal complexity relative to conventional implementation techniques.

One problem with conventional arrangements for implementing the HCA 12 according to the InfiniBand™ Architecture Specification is that transport layer service would be performed first, for example by constructing a transport layer header, generating a packet sequence number, validating the service type (e.g., reliable connection, reliable datagram, unreliable connection, unreliable datagram, etc.), and other transport layer operations. Once the transport layer operations have been completed, the packet would be sent to the link layer service for link layer operations, including service layer and virtual lane mapping, link layer flow control packet generation, link layer transmission credit checking, and other operations. Although this conventional type of implementation has the advantage of precisely following the network layers specified in the InfiniBand™ Architecture Specification, such an arrangement requires a substantially large amount of hardware. In particular, the transport layer generally requires more processing power than the link layer because the transport layer involves more complex operations. Hence, there is a need that the implementation of the transport layer in hardware does not result in a substantially complex hardware system. In addition, there is a concern with unnecessarily wasting transport layer resources on low priority operations.

According to the disclosed embodiment, link layer operations are partitioned based on the desirability to determine priorities of data packets to be transmitted. In particular, the HCA 12 of FIG. 1 includes a pre-link module configured for determining a priority of received WQEs, and a post-link module configured for preparing a data packet for transmission on the network. The pre-link module 40 orders the WQEs according to priorities determined by the pre-link module, and outputs the WQEs in the determined order to a transport service module 42 configured for generating the appropriate transport layer headers for the WQEs based on the associated queue pair attributes. In other words, the pre-link module 40 prevents the transport service module 42 from wasting resources on low priority WQEs or blocking high priority WQE's within the transport layer process. Hence, higher priority connections obtain improved service at the transport layer through the HCA.

The HCA 12, implemented for example as an application-specific integrated circuit, includes a pre-link module 40, a transport service module 42, a post-link module 44, and a media access control (MAC) module 46. The HCA 12 also has local access to a memory 48 configured for storing transport data and overflow buffers, described below.

The pre-link module 40 includes a work queue element FIFO 50, virtual lane FIFOs 52, a pre-link process module 54, a service layer to virtual lane (SL-VL) mapping table 56, a virtual lane (VL) arbitration table 58, and a virtual lane (VL) arbitration module 60.

The HCA 12 is configured for receiving data from a central processing unit (CPU) in the form of work queue elements (WQEs), stored in the WQE FIFO 50. Each WQE specifies a corresponding request, from a consumer application executed by the CPU (i.e., "requester"), for a corresponding prescribed operation to be performed by a destination InfiniBand™ network node (i.e., "responder"), for example a target. The interaction between requester and responder is specified via a queue pair (QP), where a queue pair includes a send work queue and a receive work queue.

The WQE includes service level (SL) information, and a pointer to the location of the actual message in the system memory 48. The InfiniBand™ Architecture Specification defines a service level (SL) attribute that permits a packet traversing the InfiniBand™ network 10 to operate at one of sixteen available service levels. Hence, the requester can select an available service level (based on, for example, quality of service, priority, etc.) based on a selected priority of the WQE.

The pre-link module 40 provides both service level to virtual lane mapping (SL-VL mapping), and virtual lane arbitration. In particular, virtual lanes, defined in the InfiniBand™ Architecture Specification, enable multiple logical flows to be implemented over a single physical link, where link level flow control can be applied to one virtual lane without affecting other virtual lanes. The pre-link process module 54 is configured for managing and maintaining the service layer-virtual layer mapping table 56. In particular, the pre-link process module 54 retrieves a WQE from the WQE FIFO 50, and determines the corresponding virtual lane based on the service layer specified within the WQE. Upon identifying the appropriate virtual lane for the retrieved WQE, the pre-link process module 54 forwards the WQE to the corresponding virtual lane FIFO 52.

The pre-link module 40 includes virtual lane FIFOs 52a, 52b, 52c, 52d, 52e, and 52f for storage of WQEs based on the assignment by the pre-link process module 54. For example, the virtual lane FIFO 52a is used for storing WQEs associated with embedded processor operations, for example link layer control packets and handling of error conditions. In other words, when a prescribed operation is not implemented in hardware, the request is sent to an embedded processor queue 78 for further processing by an embedded processor 80, described below; hence the embedded processor 80 has its own assigned queue 52a for outputting packets into the flow of output data traffic. The virtual lane FIFO 52b is used for storing WQEs associated with management traffic. The virtual lane FIFOs 52c, 52d, 52e, and 52f are used for storing WQEs associated with respective assigned virtual lanes. Although the disclosed embodiment discloses the use of four assigned virtual lanes, additional virtual lane FIFOs may be added for additional assigned virtual lanes.

The VL arbitration module 60 is implemented as a state machine with registers, and is configured for managing the VL arbitration table 58 for servicing of the virtual lanes, including setup, management, and teardown of the virtual lanes. The VL arbitration module 60 also determines which virtual lane to service, and outputs the WQEs from the virtual lane FIFOs 52 based on the determined priority of the virtual lanes. For example, the virtual lane FIFO 52b typically stores management (high-priority) traffic, hence the VL arbitration module 60 typically would empty the virtual lane FIFO 52b before servicing the other virtual lane FIFOs 52c, 52d, 52e, or 52f. The VL arbitration module 60 would then selectively output the WQEs from the virtual lane FIFOs 52c, 52d, 52e, or 52f based on weighted priorities stored in respective weight tables within the VL arbitration table 58.

Hence, the pre-link module 40 outputs the WQEs in a prescribed order based on a determined priority of the WQEs, for example based on assigned virtual lanes, or whether the WQE is for an embedded process, management traffic, or flow control traffic.

The transport service module 42 is configured for managing transport services, including setup, management, and teardown of queue pairs. In particular, the HCA 12 includes a queue pair setup FIFO 62 configured for storing queue pair commands received from a communication management agent. The communication management agent is responsible for setup and teardown of transport connections: the communication management agent communicates with a subnet manager to establish the transport connections for the HCA 12. In addition, the communication management agents at each end during connection establishment use a bypass service (described below with respect to bypass service submodule 68a), as opposed to a conventional transport layer service, to establish the transport connections.

The transport service module 42 includes a queue pair attributes database 64 and a queue pair attributes management module 66. The queue pair attributes management module 66 is configured for processing the queue pair commands in the queue pair setup FIFO 62, and updating the queue pair attributes database 64 based on the received queue pair commands. For example, the queue pair attributes database 64 stores information relating to a source queue pair number, a destination queue pair number, and possibly source agent and destination agent. Hence, the queue pair attributes database 64 will include all information necessary to support the different transport services, including reliable connection service, reliable datagram service, unreliable connection service, unreliable datagram service, and raw datagram service. Additional details related to the storage of queue pair attributes within the queue pair attributes database 64 are described below with reference to FIGS. 2 and 3.

The queue pair attributes management module 66 manages the transport services by updating the queue pair attributes database 64 during communication between the local and remote communication agents, for example when packet sequence numbers increase as messages are exchanged between the local and remote communication agents.

The queue pair attributes management module 66 also includes service submodules 68, each configured for managing a corresponding transport service type based on a corresponding received WQE from the pre-link module 40. For example, the bypass service submodule 68a is configured for managing bypass services during connection establishment or managing queue pairs associated with management operations with network managers that use, for example, the raw datagram service. The CPU aided service submodule 68b is configured for managing queue pairs based on embedded processor operations using the embedded virtual lane FIFO 52a; hence, the CPU aided service submodule 68b enables coordination between the local and remote embedded processes; moreover, implementation of the CPU aided service submodule 68b in conjunction with the embedded virtual lane FIFO 52a enables messages to be retransmitted if a resend request is received from the remote communication agent. The reliable connection (RC) service submodule 68c and the unreliable connection (UC) service submodule 68d are configured for managing queue pairs associated with reliable connection and unreliable connection transport services, respectively. Although not shown, the queue pair attributes management module 66 also includes submodules 68 for managing reliable and unreliable datagram services, and raw datagram service.

Hence, the transport service module 42, upon receiving a WQE from the pre-link module 40, supplies the WQE to the appropriate submodule 68 for processing (e.g., WQE for RC service handled by the RC service submodule 68c). The WQE includes service level (SL) information, and a pointer to the location of the actual message in the system memory 48. The submodule 68, in response to reception of the appropriate WQE, parses the WQE, and retrieves from the WQE the pointer that identifies the memory location for the transport data (i.e., the payload for the transport layer); the submodule 68 performs a DMA fetch of the transport data, updates the appropriate queue pair attributes within the queue pair attributes database 64, and creates and stores in the external memory 48 a transport layer header for the WQE in a corresponding transport format; for example, the submodule 68a may generate a raw transport header, whereas the modules 68c or 68d may generate a transport header according to the reliable connection service or the unreliable connection service, respectively.

The submodule 68 then creates a header pointer (p1) that identifies the location of the transport layer header. The submodule 68 then sends to the post-link module 44 the payload pointer (p2) and the header pointer (p1) as a packet request 90, enabling the post-link module 44 to assemble the transport packet for transmission based on the supplied pointers. Alternately, the submodule 68 may generate a frame pointer to a system memory location that stores the transport layer frame, including the transport layer header and the transport data. If preferred, the submodule 68 also could forward the transport layer frame (including transport layer header and transport data) to the post-link module. Alternately, while writing to the external memory, the CPU may leave blank spaces at the beginning of the data, so that the actual header information that is created within the modules 68 can be stored in the corresponding empty memory space. The pointer passed down to the post-link module 44 could be this pointer which points to the beginning of the frame in the external memory.

The post-link module 44, in response to reception of the transport layer information (e.g., transport layer frame, packet request, etc.), fetches the transport layer header and the transport layer payload from the system memory 48 for generation of the transmit packet and storage in a transmit FIFO 70. In particular, the post-link module 44 also includes a link layer control module 72 configured for generating the transmit packet by generating link layer fields (e.g., local and global routing headers, cyclic redundancy check (CRC) fields, etc.), storage of the transmit packet in the transmit FIFO 70, and handling link layer control operations according to the InfiniBand™ Architecture Specification. Once the transmit packet has been generated, the pointers are forwarded to the free buffer manager 76, described below.

The link layer control module 72 outputs the transmit packets according to a credit-based flow control. In particular, the link layer control module 72 monitors the available credits for transmission of a transmit packet on the assignment virtual lane. In particular, credits are sent on a per virtual lane basis, where a receiver issues a credit based on packets taken from an incoming virtual lane buffer; the credits are sent to the sender, enabling the sender to manage flow control. Hence, if the link layer control module 72 determines that an identified virtual lane has an insufficient number of credits, the link layer control module 72 defers transmission of the corresponding transmit packet until a sufficient number of credits have been received. If the virtual lane has a sufficient number of credits, the link layer control module 72 forwards the transmit packet to the MAC module 46 for transmission.

The MAC module 46 is configured for outputting the transmit packet stored in the transmit FIFO 70 according to the InfiniBand™ Architecture Specification. In particular, the MAC module 46 includes a transmission module 74, a free buffer manager 76, an embedded processor input queue 78, and an embedded processor 80 having a link flow control packet construction module 82. The transmission module 74 is configured for performing media access control operations, and optionally physical layer transceiver operations, for transmission of the transmit packet onto the InfiniBand™ network 10.

The free buffer manager 76 is configured for releasing available space from the external memory 48 once the transmit packet has been successfully received by the responder. In particular, the memory pointers for a transmit packet are sent from the post-link module 44 once the transmit packet has been generated; if a responder sends a message that the transmit packet needs to be resent in a reliable connection service, the transmit packet can be regenerated by the post-link module 44 and retransmitted to the responder. Once the transmit packet is successfully received, the frame pointers can be released for use by another agent.

Flow control is handled by the embedded processor 80 based on reception of information from the embedded processor input queue 78: in particular, the flow control protocol according to the InfiniBand™ Architecture Specification uses a credit-based flow control. The embedded processor 80 generates link flow control packets using the link flow control packet construction module 82, based on messages stored into the embedded processor input queue 78. The embedded processor 80 writes the link flow control packet to external memory 48; the embedded processor 80 then generates a WQE that includes the associated operation and a pointer specifying the location of a flow control packet into the embedded processor virtual lane FIFO 52a. The link flow control packet can then be output, specifying a number of available credits for another transmitting note.

Hence, the embedded processor 80 can generate a link flow control frame including the flow control header, and output the link flow control frame to the error processor input queue 78 for transmission to the network.

Figure 2:
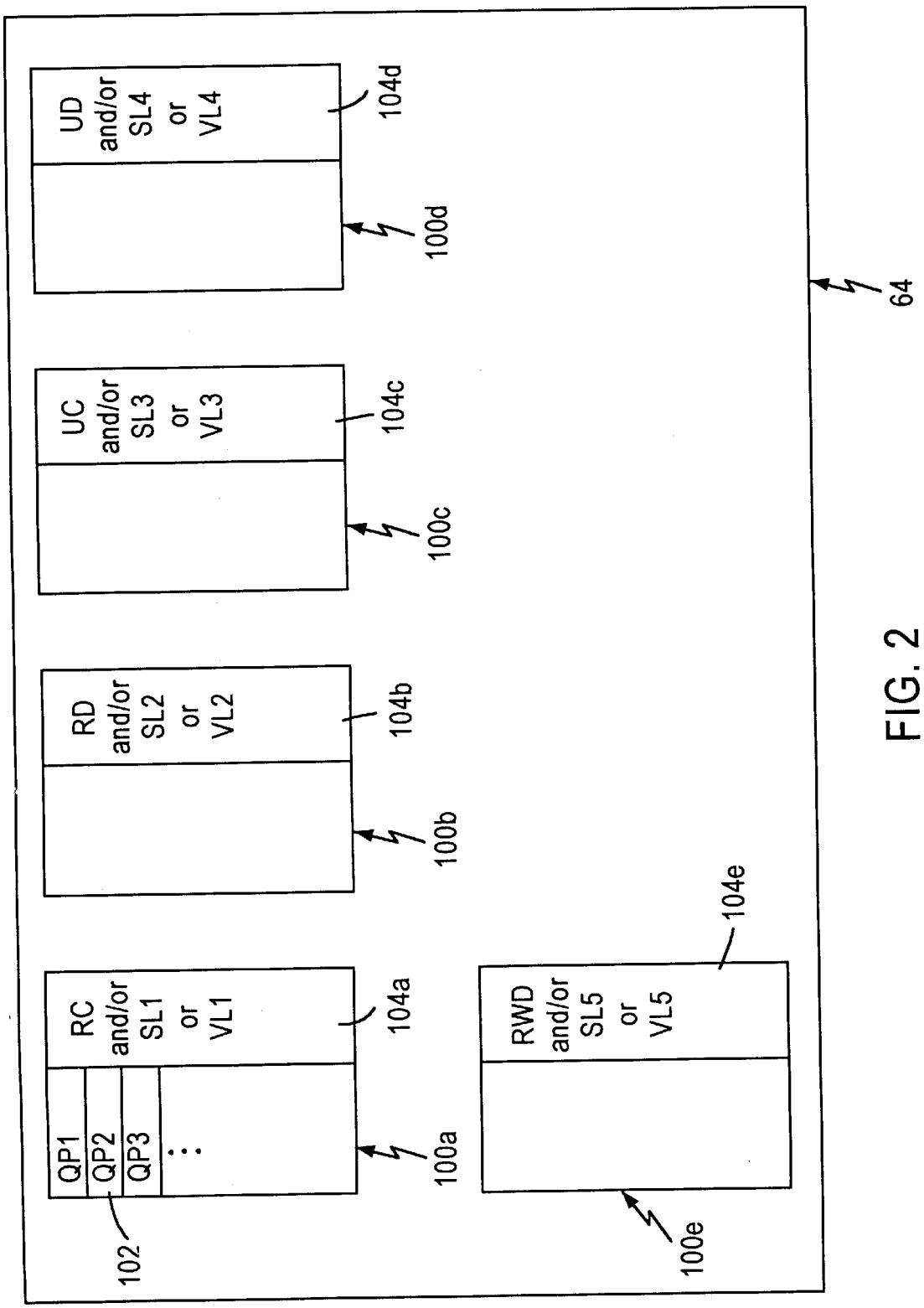
FIG. 2 is a diagram illustrating in further detail the queue pair attributes database of FIG. 1, according to an embodiment of the present invention.

FIG. 2 is a diagram illustrating in further detail the queue pair attributes database 64 according to an embodiment of the present invention. The queue pair attributes database 64 includes multiple queue pair tables 100, established and maintained by the queue pair attributes management module 66, configured for storing compressed queue pair entries 102. In particular, each queue pair table 100 has a corresponding assigned grouping of shared attributes, illustrated by the shared attributes label 104. For example, each queue pair table 100 may be configured by the queue pair attributes management module for storage of queue pairs having the same transport service, where tables 100a, 100b, 100c, 100d, and 100e are used by the queue pair attributes management module 66 for storing queue pairs for a reliable connection (RC), a reliable datagram (RD), an unreliable connection (UC), an unreliable datagram (UD), and a raw datagram (RWD), respectively; in this example, the table 100a would only store queue pair entries 102 assigned for providing a reliable connection transport service.

Alternately, each queue pair table 100 may be configured for storage of queue pairs having the same service level (SL) or the same virtual lane (VL) as the relevant shared attribute, illustrated by the shared attributes label 104. In addition, each queue pair table 100 may be configured for storing multiple shared values, where the queue pair table 100 may configured to store only queue pair entries 102 assigned for providing the relevant shared values (e.g., reliable connection and a service level having a value of SL1; or reliable connection and virtual lane having a value of VL1). Storage of queue pairs and selected queue pair tables based on virtual lane provides a higher level of compression at the expense of processing resources that may affect HCA performance; storage of queue pairs in selected queue pair tables based on service level, however, provides a lower level of compression and requires less processing resources than the virtual lane based compression, enabling the HCA to provide a higher level of performance.

In addition, the insertion of compressed queue pair entries into a queue pair table 100 based on virtual lane maintains prioritization of traffic flow, since credits used for flow control are virtual lane based.

Hence, each queue pair table 100 illustrated in FIG. 2 can be configured for storing queue pair entries 102 for queue pairs having the same transport service; the same transport service and/or the same service level; or the same transport service and/or the same virtual lane. Hence, the queue pair attributes database 64 is able to store multiple virtual queue pairs using fewer physical queue pairs using the partitioned queue pair tables 100. Note that other relevant attributes may be used for shared attributes in compressing the information necessary for a queue pair entry 102 into a selected queue pair table.

Figure 3:
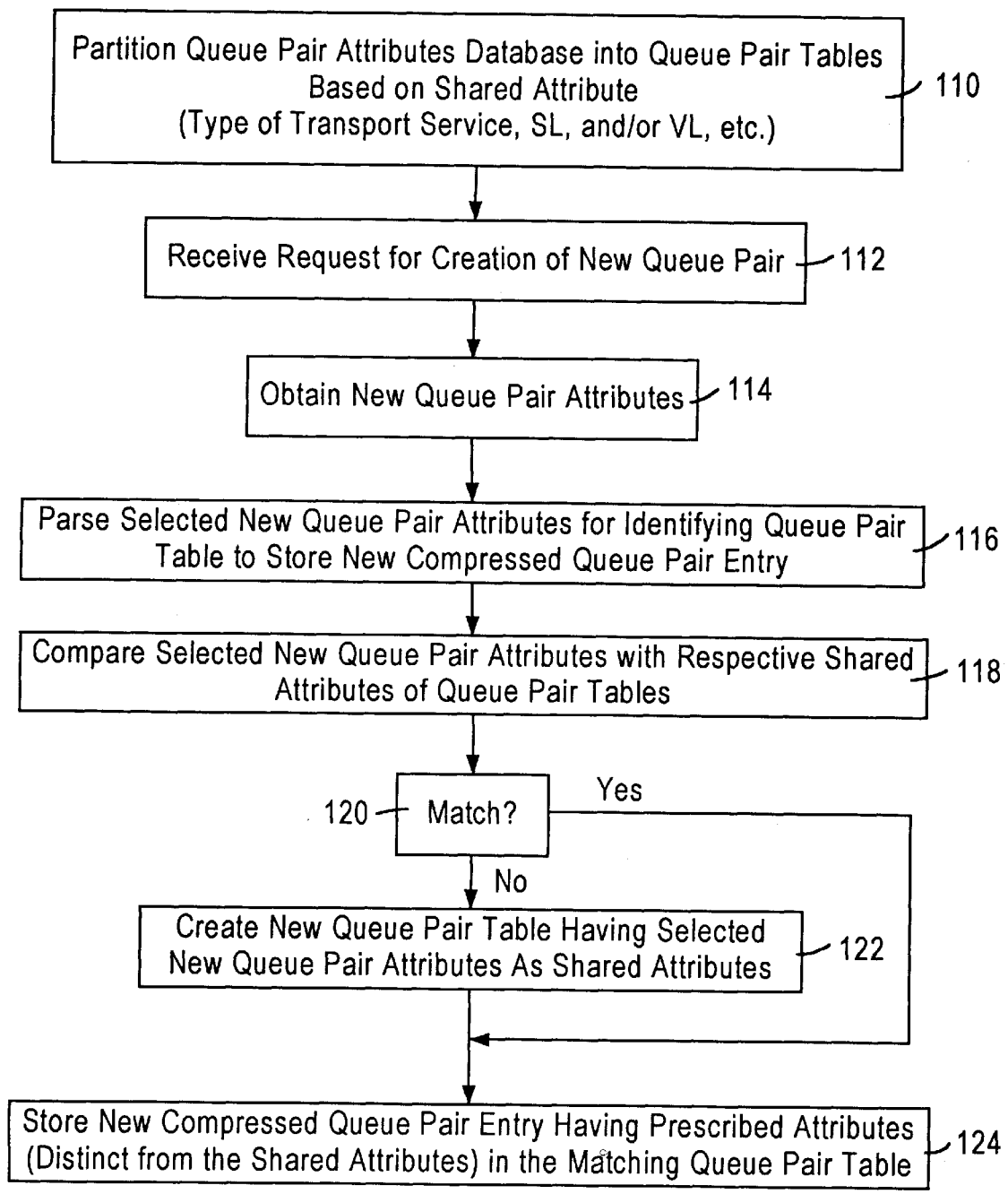
FIG. 3 is a diagram illustrating the method of storing a new queue pair into the queue pair attributes database, according to an embodiment of the present invention.

FIG. 3 is a diagram illustrating the method of creating and storing a new compressed queue pair entry into the queue pair attributes database 64 according to an embodiment of the present invention. The method begins in step 110, where the queue pair attributes management module 66 partitions the queue pair attributes database 64 to establish the multiple queue pair tables 100 based on selected shared attributes, for example type of transport service, service level, virtual lane, etc.

After the queue pair tables 100 have been established, the queue pair attributes database 64 is able to begin storage of a new compressed queue pair entry. In particular, the queue pair attributes management module 66 receives in step 112 a request for creation of a new queue pair, for example based on queue pair commands received from a local or remote communication management agent, or a subnet manager.

The queue pair attributes management module 66 obtains in step 114 the new queue pair attributes from the received queue pair commands, and parses in step 116 selected new queue pair attributes to identify the queue pair table 100 to be used to store the new compressed queue pair entry. In particular, the queue pair attributes management module 66 compares in step 118 the selected attributes from the new queue pair with the respective shared attributes (illustrated by the respective labels 104) of the queue pair tables 100 to determine a match.

If in step 120 no match is detected, the queue pair attributes management module 66 creates in step 122 a new queue pair table 100 having the selected queue pair attributes as the shared attributes. However if in step 120 a match is detected, the queue pair attributes management module 66 stores in step 124, in the selected queue pair table 100 having the matching attributes 104, a new compressed queue pair entry 102 that includes the necessary attributes of the new queue pair, except for the shared attributes. Hence, the new entry 102 only needs to store the information that is distinct from the shared attributes 104, enabling the storage of multiple virtual queue pairs out of fewer physical queue pairs within the database 64.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a host channel adapter, the method comprising:

receiving a request for creation of a new queue pair;

identifying one of a plurality of queue pair tables by determining a match between at least one selected attribute for the new queue pair with respective shared attributes of the queue pair tables, each queue pair table having compressed queue pair entries representing queue pairs having the corresponding shared attribute; and storing a new compressed queue pair entry having prescribed attributes of the new queue pair, distinct from the corresponding shared attribute, in the one shared queue pair table having the corresponding shared attribute matching the at least one selected attribute.

2. The method of claim 1, wherein the at least one selected attribute specifies a type of transport service, the determining step including determining a match between the specified type of transport service and the respective types of transport service, assigned as the respective shared attributes, of the queue pair tables.

3. The method of claim 2, wherein the shared attributes of each queue pair table includes the corresponding type of transport service and a corresponding service level, the determining step further including determining a match for both the specified type of transport service and an assigned service level for the new queue pair relative to the type of transport service and a prescribed service level assigned to each of the queue pair tables.

4. The method of claim 3, wherein the specified type of transport service specifies one of a reliable connection, a reliable datagram, an unreliable connection, an unreliable datagram, and a raw datagram.

5. The method of claim 2, further comprising assigning the new queue pair to an assigned virtual lane, the shared attributes of each queue pair table including the corresponding type of transport service and a corresponding prescribed virtual lane, the determining step further including determining a match for both the specified type of transport service and the assigned virtual lane for the new queue pair relative to the type of transport service and the prescribed virtual lane for each of the queue pair tables.

6. The method of claim 1, wherein the at least one selected attribute specifies an assigned virtual lane, the determining step including determining a match between the assigned virtual lane and respective prescribed virtual lanes, assigned as the respective shared attributes of the queue pair tables.

7. A host channel adapter comprising:

a queue pair attributes database configured for storing prescribed attributes of queue pairs, the queue pair attributes database including a plurality of queue pair tables having respective shared attributes, each queue pair table configured for storing compressed queue pair entries representing queue pairs having the corresponding shared attribute; and a queue pair attributes management module configured for storing a new queue pair, as a new compressed queue pair entry, in an identified one of the queue pair tables having the corresponding shared attribute matching at least one selected attribute of the new queue pair, the new compressed queue pair entry having prescribed attributes of the new queue pair, distinct from the corresponding shared attribute.

8. The apparatus of claim 7, wherein the shared attribute includes at least one of a type of transport service and a service level.

9. The apparatus of claim 7, wherein the shared attribute includes at least one of a type of transport service and a virtual lane.

10. The apparatus of claim 9, wherein the at least one selected attribute of the new queue pair specifies, as the type of transport service, one of a reliable connection, a reliable datagram, an unreliable connection, an unreliable datagram, and a raw datagram.

* * * * *